(No Model.)
H. HIRSCHING.
PROCESS OF TREATING ORES CONTAINING SILVER AND GOLD.
No. 581,160. Patented Apr. 20, 1897.
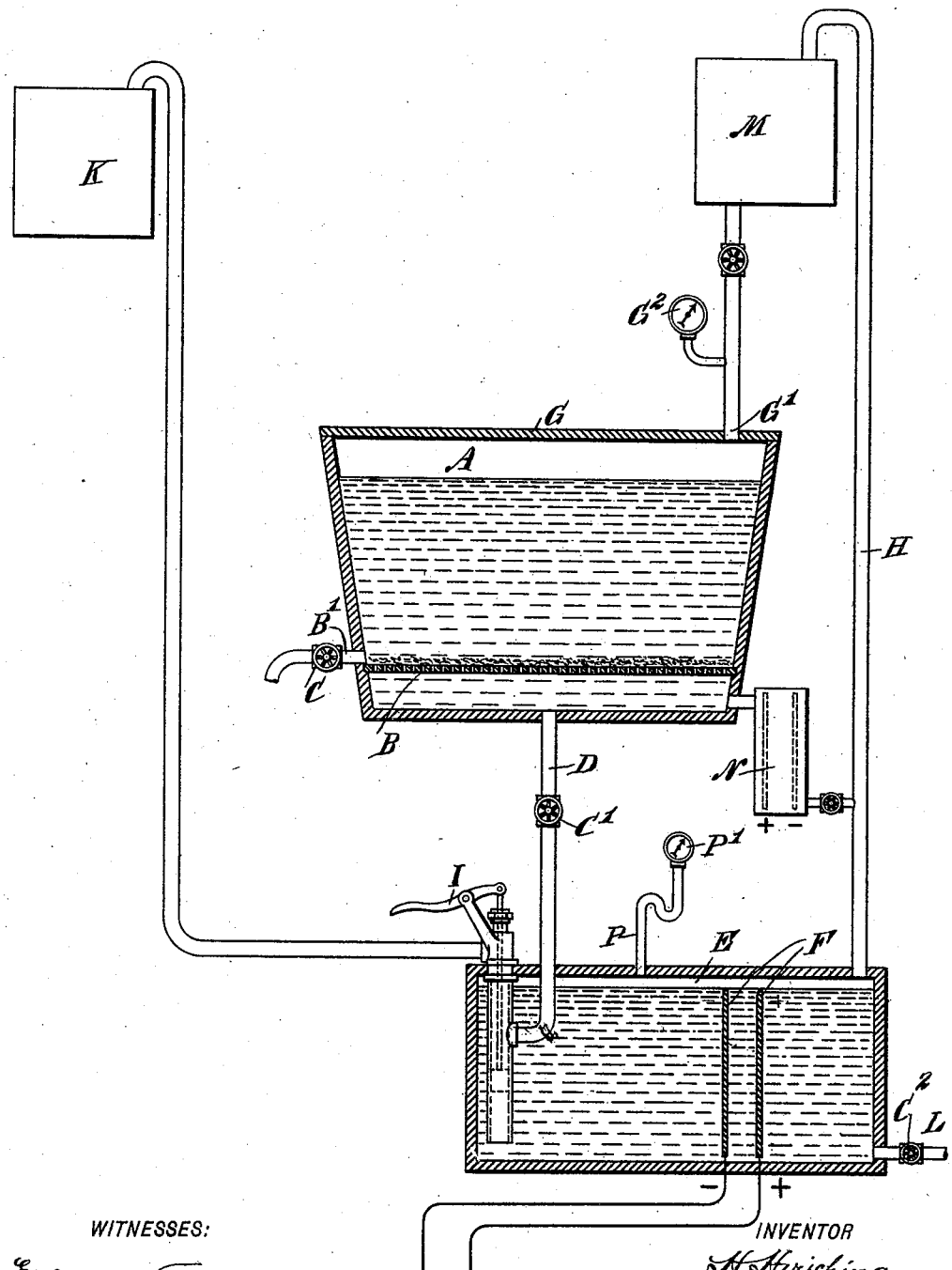
WITNESSES:
Edward Thorpe,
John Lotka
INVENTOR
H. Hirsching
BY
Munn & Co
ATTORNEYS.

UNITED STATES PATENT OFFICE.

HENRY HIRSCHING, OF SALT LAKE CITY, UTAH.

PROCESS OF TREATING ORES CONTAINING SILVER AND GOLD.

SPECIFICATION forming part of Letters Patent No. 581,160, dated April 20, 1897.

Application filed August 9, 1895. Serial No. 558,734. (No specimens.)

*To all whom it may concern:*

Be it known that I, HENRY HIRSCHING, a citizen of the United States, residing in Salt Lake City, in the county of Salt Lake and Territory of Utah, have invented a certain new and useful Improvement in the Treatment of Copper Ores Containing Silver and Gold, of which the following is a full, clear, and exact description.

My invention relates to a process which has for its object principally the obtaining of copper from copper ores, but it is also applicable for obtaining silver and gold from ores containing the same, whether with or without copper. It is an ammonia process which is applicable to auriferous and argentiferous ores generally, but is advantageously and economically effective with refractory ores from which copper could not be obtained satisfactorily or profitably by the melting and other processes hitherto employed. In ores containing native copper or sulfids, arsenids, carbonates, oxids, or other compounds the copper is dissolved by my solvent and readily precipitated by chemical or electric action. If desired, the ores, especially those containing sulfids, might be calcined in a furnace before lixiviation, and yet the solvent will be profitably applicable as compared with the old and complicated processes.

Before describing my invention in detail I will state that I am aware that it is not broadly new to employ an ammonia process for the separation of metals from the gangue with which they are found or to precipitate or to deposit from metal solutions such metals as copper, gold, and silver. However, my improvement and combination of the process is superior, new in its application and final result, and strictly subjected to the chemical laws with some entirely new reactions, and therefore it is a new method in hydroelectro metallurgy. For instance, a considerable amount of ammonia was lost by one method, owing to the want of a careful adjustment of the necessary amount of ammonia to the quantity of copper contained in the ore and also owing to defects of the apparatus constructed for attempting to regain the ammonia-gas by distilling the metal solution, whereby ammonia-gas is evolved, and this is partly decomposed into its component parts of nitrogen and hydrogen, and hydrated copper oxid and copper oxid is retained in the distilling apparatus. It is a well-known fact that if blue vitriol is dissolved in water and ammonia is added a precipitate of copper-ammonium sulfate is formed, which is dissolved in an excess of ammonia, and similar reactions take place with other artificial manufactured soluble copper salts, if they are subjected to an electric action. In each case ammonia-gas ($NH_3$) is produced on the anode, said gas being subsequently decomposed into nitrogen and hydrogen, also the copper deposited on the cathode always contains cuprous oxid, whereas I have found by actual experiments and analysis that an entirely different reaction takes place if crude or calcined copper ores are treated. By passing ammonia-gas in contact with metallic copper or copper ores I invariably obtain an ammoniated copper with the formula $Cu(NH_3)_2$, which is readily soluble in water. By then subjecting this copper solution to electric action I obtained ammonia-gas ($NH_3$) on the anode and metallic copper was deposited on the cathode. It can be seen that when working on the first-mentioned principle unsurpassable difficulties prevent the recovery or regeneration of the applied ammonia and also the obtaining of a good quality of copper.

In practice the ammonia process for treating copper ores must necessarily be a failure if the applied ammonia is lost and decomposed and cannot be recovered and if subsequent treatment of the obtained hydrated copper oxid, copper oxid, or cuprous oxid, and metallic copper render the process too expensive for practical purposes. I therefore first change the *modus operandi* in the precipitation of the copper from the metal solution and add ammonium sulfid or alkaline sulfids, whereby the copper is precipitated as hydrated copper sulfid and the solution can be used over again without any considerable loss of ammonia. Of course care must be taken not to use an excess of the sulfids, and ammonium sulfid is preferable to the alkaline sulfids, as the ammonia set free from the first-mentioned precipitant strengthens the solvent power of the solution, whereas the alkalies set free from the second-mentioned precipitant weaken the solvent power of the solution. In order to regulate this precipitation process, I analyze a few cubic centimeters of the metal solution, and knowing the exact strength of the sulfids and the quantity of the copper in the metal solution I add exactly the amount of sulfids which is required to precipitate the copper as hydrated copper sulfid. This manipulation also is necessary to prevent the formation of the hypo compounds. I have treated the precipitate in the furnace, as well as with such chemicals as sulfuric and nitric acids, and deposited the copper electrolytically on the cathode as metallic copper, and I have no doubt that in some localities where the sulfids can be obtained as by-products or cheap this method can be used to advantage in lieu of the old and known processes of treating copper ores.

Reference is to be had to the accompanying drawing, forming a part of this specification, the figure being an elevation with parts in section, showing the several parts of a plant for carrying out my invention.

The apparatus consists of a lixiviation-vat A, which is provided with a false perforated bottom B, which also might be covered with burlap in order to obtain a good filter, but gravel or any other suitable material may be used as well, and, further, I provide the top of the vat A with a removable cover G, which should fit as tight as possible. An inlet-tube G' with a stop-cock is provided for supplying water for the solution and also to allow air or gases to pass through it, and a pressure-gage $G^2$ may be attached to the pipe G' to indicate the pressure in the tank. In the bottom B is an outlet-tube D with a stop-cock C', which tube can be used for charging the ore-vat A from below, by pressure, with the solution or with gas or air, and also for discharging the clear metal solution into a tank E. The latter can be used either for precipitating purposes, according to the sulfid method, or for depositing the metallic copper and disengaging the ammonia by electric action, as the case may be. Just above the false bottom of the ore-vat A, I provide a discharge-pipe B' for the leached ore. This pipe is provided with a stop-cock C and can be used for discharging tailings if sufficient water is at hand.

The tank E is constructed perfectly tight and is provided with electrodes F and the outlet D, which is used as described above. At the bottom is a discharge-pipe L, provided with a stop-cock $C^2$ for the purpose of passing the liquor into a storage-tank, and the same outlet can be used for discharging the waste or washing water. Further, I connect the top of the tank E near the anode, by means of an iron pipe H, to a closed solution-tank M, where all the disengaged gas is absorbed. If desired, this pipe might be connected with the outlet D of the vat A. This arrangement would allow the disengaged ammonia-gas to pass directly from the metal solution into the vat A. In the cover of the tank E is secured a bent pipe P, filled with liquor to form a movable index, which will enable the attendant to watch the variations of pressure in the tank E and to keep said pressure approximately constant by an appropriate operation of the pump I (to be referred to presently) or by regulating the strength of the current supplied from the dynamo O, so as to prevent the return of the liquid from the tank M into the tank E in case of irregular production of gases. A pressure-gage P' may be attached to the pipe P. It is also preferable to attach a pump I to the electrolytic tank E. This pump is so constructed that it can be used for pumping the ammonia liquor into the vat E or for forcing air into the ore-vat A through the pipe D. It can also be used for pumping liquor into the storage-tank K. The electrodes F are suspended or supported in the solution in the closed tank E, and I prefer to use for an anode a carbon plate and for the cathode a copper plate. All the metal which is above the solution should be well insulated, or the electrodes might be placed in the tank and connected with a source of electric energy from below or from the sides.

My improved process is preferably carried out as follows: After obtaining by analysis the percentage of copper in any kind of ore I prepare a solution of ammonia or carbonate of ammonia, separately or both mixed; but in either case I may or may not add nitrate of ammonia or a nitrate of an alkali metal. I find that by the addition of the nitrates a more complete extraction can be obtained, and therefore I always add a small per cent. of the nitrates. The advantage of adding a nitrate will be fully explained hereinafter. I prepare the nitrate of ammonia simply by neutralizing some ammonia with nitric acid. I take care that the solution for complete extraction in one and the same operation should be so strong that the radical ($NH_3$) ammonia is in such proportion to the amount of copper in the ore that the formation of the soluble copper salt or ammoniated copper hereinbefore referred to is possible. If the radical ($NH_3$) ammonia is less than the copper in the ore requires for the formation of its soluble salt, no complete extraction can be expected. In order to secure the proper formation of the above-mentioned soluble ammoniated copper, $Cu(NH_3)_2$, about four to five parts of ammonia to one part of the sulfids should be used. I now place the powdered crude or calcined ore in the lixiviation-vat A and charge the ore with the above-described solution, allowing sufficient time for a thorough mixture and solution; or the moistened ore may first be charged in the vat A with ammonia-gas from the pipe H through the electrolytic tank E and then with the solution or with water, as above described, allowing in either case sufficient time for the conversion of the copper into the soluble copper salt. As shown in the drawing, I provide an electrolytic tank N adjacent to the vat A and interposed between the said vat and the pipe H. It will be understood that in this case the tank E is dispensable and the ammonia set free will directly pervade or permeate the ore, while at the same time the deposition of copper will be going on. Thus a much weaker solution may be used than in the case above described. In case the tank E is employed the metal solution is discharged from the vat A into the said tank through the pipe D as soon as the ore has been satisfactorily dissolved. I then wash the ore remaining in the vat A with a weak solution or with water, and after repeating the operation as often as may be deemed necessary the copper and part of the ammonia are recovered in the electrolytic tank E or N. As soon as the said tank is sufficiently filled with the metal solution and the current from the dynamo O or other source of electric energy is turned on, pure metallic copper is deposited on the cathode and can be sold directly or remelted into suitable bars. Precaution ought to be taken to keep the current flowing during the time of the removal of the copper plates, and also they ought to be washed with water and afterward immersed for a moment in an acidified bath. From the anode ammonia-gas ($NH_3$) is evolved, which may be disposed of through the pipe H, as described. No loss of ammonia will occur, and the ammonia once applied can be used indefinitely and repeatedly on new batches of ore. It cost me only one and one-half cents to produce one pound of copper from the ore.

It should be mentioned that in case a large quantity of diluted ammonia liquor has been produced it can be recovered by neutralizing with hydrochloric acid and evaporating for crystallization, or it might be distilled with lime or soda, thus regenerating concentrated ammonia after well-known methods.

I will now explain the advantage of adding a nitrate to the ammonia. I have observed that ammonia is subjected to oxidation when coming in contact with copper or other metal salts, a small quantity of nitric trioxid being formed. This reaction I believe is of great assistance in converting the metals (copper) into a form in which they are readily soluble in ammonia. Now if I add a nitrate, even in very slight proportions, a complete oxidation and rapid solution of the metals take place and less ammonia is required, as will be apparent from the following equations:

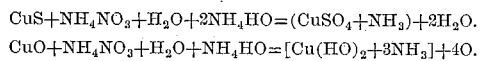

showing that there is a considerable amount of oxygen *in statu nascendi* to oxidize the copper sulfids for subsequent solution. The addition of nitrates increases the conductivity of the metal solution, thus reducing the resistance in the electrolytic tank. Furthermore, the metal obtained on the cathode is more compact, and, finally, if a surplus of nitrates should be present it will be converted by the electrolytic action into ammonia, thus increasing the solvent power of the subsequent lixiviating solution.

If there is arsenic in the ore, I add to the solution a magnesia compound which prevents the solution of arsenic. If gold and silver should be in the metal solution, they will be precipitated by the sulfid method as sulfids with the copper, and I separate them in the usual way. By the electric method I obtain the silver first on the cathode, and therefore I can recover silver and copper separately by using alternately a silver and copper plate on the cathode. As soon as the silver plate turns reddish I remove it and place a copper plate in its place, and then I continue with the current until all or nearly all the copper is deposited on the plate. Of course I regulate the weight of the copper plates according to the requirements of the market. The gold settles to the bottom and is collected later on by a regular clean up.

It can be readily seen that the copper, whose presence is objectionable in the cyanid process, is removed from the ore, and as the copper ores usually contain gold in excess of silver the gold and silver can now be readily extracted from the ore-body without removing it from the vat A, either by a chlorination process, cyanid, or hyposulfite solution, processes so well known that no description is deemed necessary. I find that the first treatment with my ammonia process prepares the silver and the gold in the ore for an easy extraction by one or the other methods described above.

I desire it to be understood that ammonia-gas, an ammonia solution, or a solution of carbonate of ammonium are equivalents to a certain extent, although free ammonia-gas has a more energetic action than the other compounds named; and the claims, so far as they refer to ammonia broadly, are intended to cover the equivalents of ammonia-gas.

Having thus described my invention, I claim as new and desire to secure by Letters Patent—

1. The process of treating copper ores, which consists in subjecting them in the presence of moisture to the action of ammonia and a nitrate, and then decomposing the resulting solution to separately recover therefrom the metal or metals and the ammonia, substantially as described.

2. The process of treating copper ores containing precious metals, which consists in subjecting them to the action of a solvent to dissolve the metals and then electrolyzing the solution, first with a cathode of the precious metal and then with a copper cathode, substantially as described.

3. The process of treating ores, which consists in subjecting them in the presence of moisture to the action of ammonia and a nitrate, and then precipitating the metal or metals from the resulting solution, substantially as described.

4. The process of extracting metals from ores in the form of a solution, which consists in subjecting the ores in the presence of moisture to the action of ammonia and a nitrate, substantially as described.

HENRY HIRSCHING.

Witnesses:
D. N. STRAUP,
LEO VON TAUFFKERCHEN.